US012798188B2

(12) United States Patent
Elsey

(10) Patent No.: US 12,798,188 B2
(45) **Date of Patent: *Nov. 17, 2026**

(54) APPARATUS AND METHOD FOR MAKING A STEREOLITHOGRAPHIC OBJECT

(71) Applicant: Zydex Pty Ltd, Alexandria (AU)

(72) Inventor: Justin Elsey, Alexandria (AU)

(73) Assignee: Zydex Pty Ltd, Alexandria (AU)

( * ) Notice: Subject to any disclaimer, the term of this patent is extended or adjusted under 35 U.S.C. 154(b) by 191 days.

This patent is subject to a terminal disclaimer.

(21) Appl. No.: 18/886,669

(22) Filed: Sep. 16, 2024

(65) Prior Publication Data

US 2025/0010546 A1 Jan. 9, 2025

Related U.S. Application Data

(63) Continuation of application No. 17/691,154, filed on Mar. 10, 2022, now Pat. No. 12,115,728, which is a continuation of application No. 16/495,400, filed as application No. PCT/AU2018/050255 on Mar. 20, 2018, now Pat. No. 11,318,672.

(30) Foreign Application Priority Data

Mar. 20, 2017 (AU) ................................ 2017900981

(51) Int. Cl.

| | |
|---|---|
| ***B29C 64/245*** | (2017.01) |
| ***B29C 64/135*** | (2017.01) |
| ***B29C 64/232*** | (2017.01) |
| ***B33Y 10/00*** | (2015.01) |
| ***B33Y 30/00*** | (2015.01) |

(52) U.S. Cl.
CPC .......... *B29C 64/245* (2017.08); *B29C 64/135* (2017.08); *B29C 64/232* (2017.08); *B33Y 10/00* (2014.12); *B33Y 30/00* (2014.12)

(58) Field of Classification Search
CPC .... B29C 64/124; B29C 64/129; B29C 64/135
See application file for complete search history.

(56) References Cited

U.S. PATENT DOCUMENTS

| | | | |
|---|---|---|---|
| 2011/0089610 A1 | 4/2011 | El-Siblani et al. |
| 2013/0270746 A1 | 10/2013 | Elsey |
| 2014/0191442 A1 | 7/2014 | Elsey |

(Continued)

FOREIGN PATENT DOCUMENTS

WO WO 2016/122408 A1 8/2016

OTHER PUBLICATIONS

International Search Report mailed Jun. 6, 2018 in related International Patent Application No. PCT/AU2018/050255.

(Continued)

*Primary Examiner* — Ariella Machness
(74) *Attorney, Agent, or Firm* — Christensen, Fonder, Dardi & Busse PLLC; John P. Fonder

(57) ABSTRACT

An object can be made one section at a time, that is layerwise, using an apparatus for making an object using a stereolithographic method. In a step of the stereolithographic method, a layer of a material used for making the object may be solidified in the shape of a section of the object. Disclosed herein is an apparatus for making a stereolithographic object. Also disclosed herein is a method for making a stereolithographic object.

11 Claims, 14 Drawing Sheets

(56) References Cited

U.S. PATENT DOCUMENTS

| | | | |
|---|---|---|---|
| 2016/0046071 | A1 | 2/2016 | Kuhnlein |
| 2016/0107340 | A1 | 4/2016 | Joyce |
| 2016/0136902 | A1 | 5/2016 | Stadlmann |
| 2016/0193786 | A1 | 7/2016 | Moore et al. |
| 2016/0288421 | A1 | 10/2016 | Costabeber |
| 2016/0303795 | A1 | 10/2016 | Liu et al. |
| 2017/0217052 | A1 | 8/2017 | Wu |
| 2017/0297261 | A1* | 10/2017 | Schultheiss ............ B33Y 30/00 |
| 2018/0029296 | A1* | 2/2018 | Van Esbroeck ....... B29C 64/286 |

OTHER PUBLICATIONS

Written Opinion in related International Patent Application No. PCT/AU2018/050255.

Extended European Search Report in related European Patent Application No. 18771024.9.

* cited by examiner

APPARATUS AND METHOD FOR MAKING A STEREOLITHOGRAPHIC OBJECT

CROSS-REFERENCE TO RELATED APPLICATIONS

This application is a continuation of U.S. patent application Ser. No. 17/691,154, filed Mar. 10, 2022, which is a continuation of U.S. patent application Ser. No. 16/495,400, filed Sep. 19, 2019, now U.S. Pat. No. 11,318,672, issued May 3, 2022, which is a National Phase entry of PCT Application No. PCT/AU2018/050255, filed Mar. 20, 2018, which claims the benefit of Australian Patent Application No. 2017900981, filed Mar. 20, 2017, which are hereby incorporated by reference in their entirety.

TECHNICAL FIELD

The disclosure herein generally relates to stereolithography, and particularly but not exclusively to apparatus for making a stereolithographic object and methods for making a stereolithographic object.

BACKGROUND

An object can be made one section at a time, that is layerwise, using an apparatus for making an object using a stereolithographic method. In a step of the stereolithographic method, a layer of a material used for making the object may be solidified in the shape of a section of the object. The step may be repeated until each of a plurality of sections constituting the object are made.

The object being made, however, may experience significant forces during execution of the stereolithographic method, which may damage the object being made or place restrictions on how fine or delicate an object can be made.

Making flat sections may also desirable so that the object made is in accordance with specifications.

It may be desirable to have improved apparatus for making an object.

SUMMARY

Disclosed herein is an apparatus for making a stereolithographic object. The apparatus comprises a platform for making the stereolithographic object thereon, a surface and a flexible element mounted in spaced apart relation to the surface to define a gap therebetween, wherein in use a material for making the stereolithographic object is disposed between the platform and the flexible element. The apparatus comprises a positioner operably coupled to at least one of the platform and the surface and operable to reduce the distance between the platform and the surface, wherein when the distance between the platform and the surface is so reduced the gap remains at least partially open.

In an embodiment, when the distance is so reduced a portion of the gap is closed and another portion of the gap remains open. The material for making the stereolithographic object may comprise a fluid for making the stereolithographic object, and the platform and the surface may be cooperatively arranged for the fluid for making the stereolithographic object to hydraulically couple the stereolithographic object when being made to the flexible element such that the portion of the gap is hydraulically closed when the positioner is operated to reduce the distance between the platform and the surface.

In an embodiment, the gap remains at least partially open for the ingress of another fluid between the flexible element and the surface when the positioner is operated to increase the distance between the platform and the surface.

In an embodiment, the other fluid comprises air.

An embodiment comprises a flexible element tensioner contacting the flexible element and defining a space interior of the flexible element tensioner comprising the gap. The flexible element tensioner may be arranged for pressure equalisation between the gap and an exterior of the flexible element tensioner.

An embodiment may comprise one or more biasing elements that bias the flexible element tensioner and the flexible element together.

In an embodiment, the flexible element tensioner comprises at least one pressure equalisation port for pressure equalisation between the space interior of the flexible element tensioner and the exterior of the flexible element tensioner.

In an embodiment, each of the at least one pressure equalisation port comprises at least one of a groove and an aperture.

An embodiment comprises a member comprising the surface, wherein the member and the flexible element tensioner are cooperatively arranged to define at least one pressure equalisation port therebetween.

In an embodiment, a flexible element tensioner surface in contact with the flexible element is configured to define at least one pressure equalisation port.

In an embodiment, the at least one pressure equalisation port comprises a passageway that provides fluid communication between the interior space and the atmosphere.

An embodiment comprises a fluid occluding diaphragm across each of the at least one pressure equalisation port.

An embodiment comprises a vessel for the material, the vessel comprising the flexible element.

In an embodiment, the flexible element is at a bottom of a vessel for containing the material.

In an embodiment, the surface is a reference surface for receiving the flexible element and configured for shaping the flexible element when so received.

Disclosed herein is an apparatus for making a stereolithographic object. The apparatus comprises a flexible element having a material receiving surface for disposing thereon a material for making the stereolithographic object. The apparatus comprises a surface and a flexible element supporting member that supports the flexible element spaced apart from the surface, the surface being for receiving the flexible element and configured for shaping the flexible element when so received.

In an embodiment, the flexible element supporting member supports the flexible element spaced apart from the surface to defined a gap therebetween.

In an embodiment, the gap remains at least partially open when the flexible element is received by the surface for the ingress of a fluid between the flexible element and the surface.

In an embodiment, the fluid is air.

In an embodiment, the fluid is Earth's atmosphere.

An embodiment comprises a positioner operably coupled to at least one of the platform and the surface and operable to reduce the distance between the platform and the surface, wherein when the distance between the platform and the surface is so reduced the gap remains at least partially open.

In an embodiment, the distance is so reduced a portion of the gap is closed and another portion of the gap remains open.

In an embodiment, the material for making the stereolithographic object comprises a fluid for making the stereolithographic object, and the platform and the surface are cooperatively arranged for the fluid for making the stereolithographic object to hydraulically couple the stereolithographic object when being made to the flexible element such that the portion of the gap is hydraulically closed when the positioner is operated to reduce the distance between the platform and the surface.

In an embodiment, the flexible element supporting member comprise at least one pressure equalisation port.

An embodiment comprises a reference plate comprising the surface, wherein the reference plate and the flexible element supporting member are cooperatively arranged to define at least one pressure equalisation port therebetween.

An embodiment comprises a fluid occluding diaphragm across each of the at least one pressure equalisation ports.

Disclosed herein is a method for making a stereolithographic object. The method comprises disposing a material for making a stereolithographic object between a platform for making the stereolithographic object and a flexible element. The flexible element is mounted in spaced apart relation to a surface to define a gap therebetween. The method comprises reducing the distance between the platform and the surface to no more than partially closing the gap.

In an embodiment, reducing the distance closes a portion of the gap while another portion of the gap remains open.

In an embodiment, the material for making the stereolithographic material comprises a fluid for making the stereolithographic material and comprising hydraulically coupling the stereolithographic object when being made to the flexible element with the material such that the portion of the gap is hydraulically closed when the positioner is operated to reduce the distance between the platform and the surface.

In an embodiment, the other portion of the gap remains open for ingress of another fluid between the flexible element and the surface when the positioner is operated to increase the distance between the platform and the surface.

An embodiment comprises the step of equalising pressure between the gap and an exterior.

Disclosed herein is a method for making a stereolithographic object. The method comprises the step of disposing a material used to make the stereolithographic object on a surface of a flexible element spaced apart from a reference surface. The method comprises moving a portion of the stereolithographic object to a position adjacent the flexible element for forming a stereolithographic layer, whereby a part of the flexible element opposite the portion is caused to abut the reference surface and another part of the flexible element separated from the portion remains spaced apart from the reference surface. The method comprises moving the portion away from the flexible element subsequent to the stereolithographic layer being formed, wherein a fluid is introduced between the part of the flexible element and the reference.

Disclosed herein is non-transitory processor readable tangible media including program instructions which when executed by a processor causes the processor to perform a method disclosed above.

Disclosed herein is a computer program for instructing a processor, which when executed by the processor causes the processor to perform a method disclosed above.

Any of the various features of each of the above disclosures, and of the various features of the embodiments described below, can be combined as suitable and desired.

BRIEF DESCRIPTION OF THE FIGURES

Embodiments will now be described by way of example only with reference to the accompanying figures in which.

DESCRIPTION OF EMBODIMENTS

Figure 1:
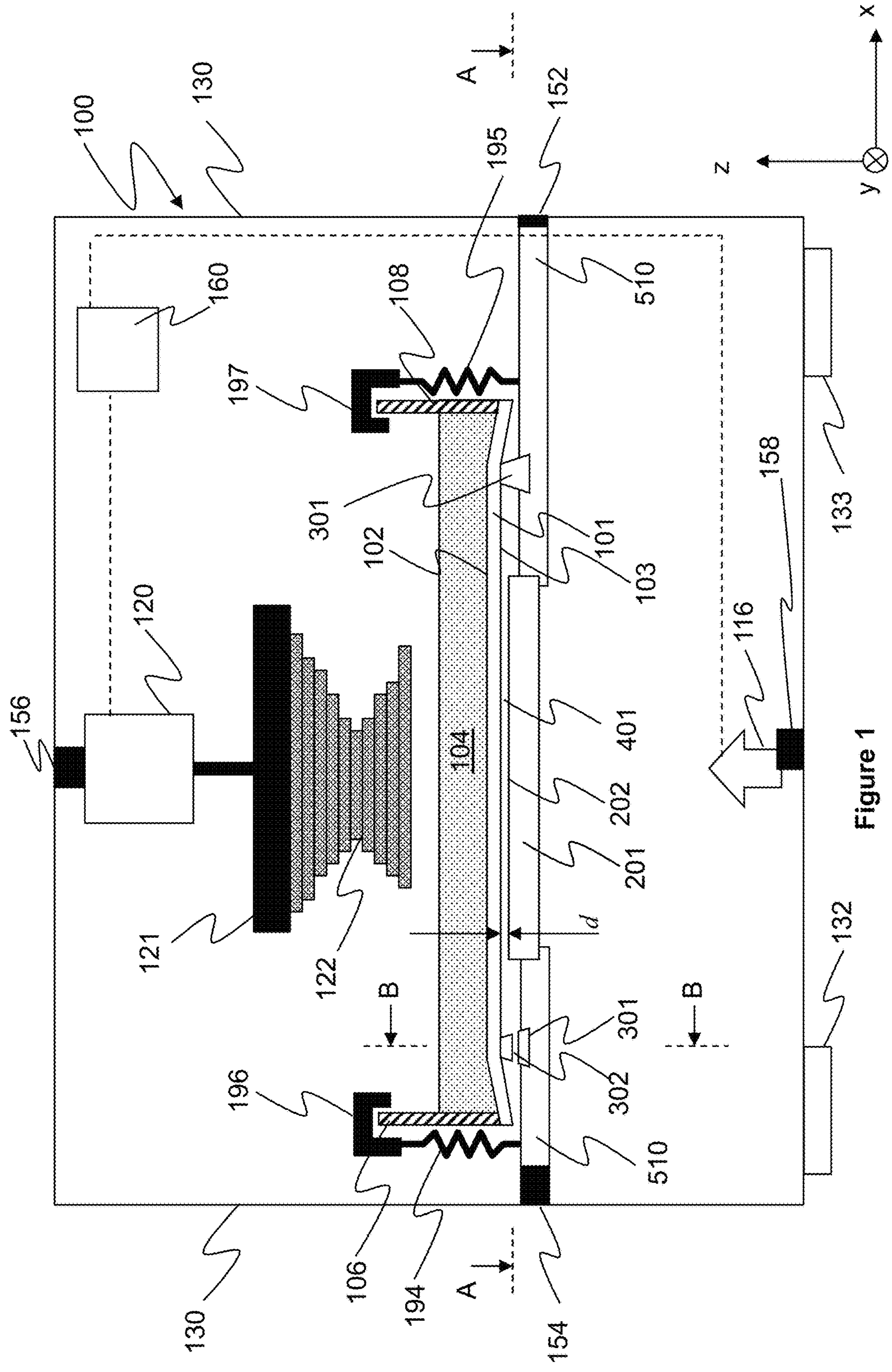
FIGS. 1 to 5 show schematic elevation views of one embodiment of an apparatus for making a stereolithographic object.
Figure 2:
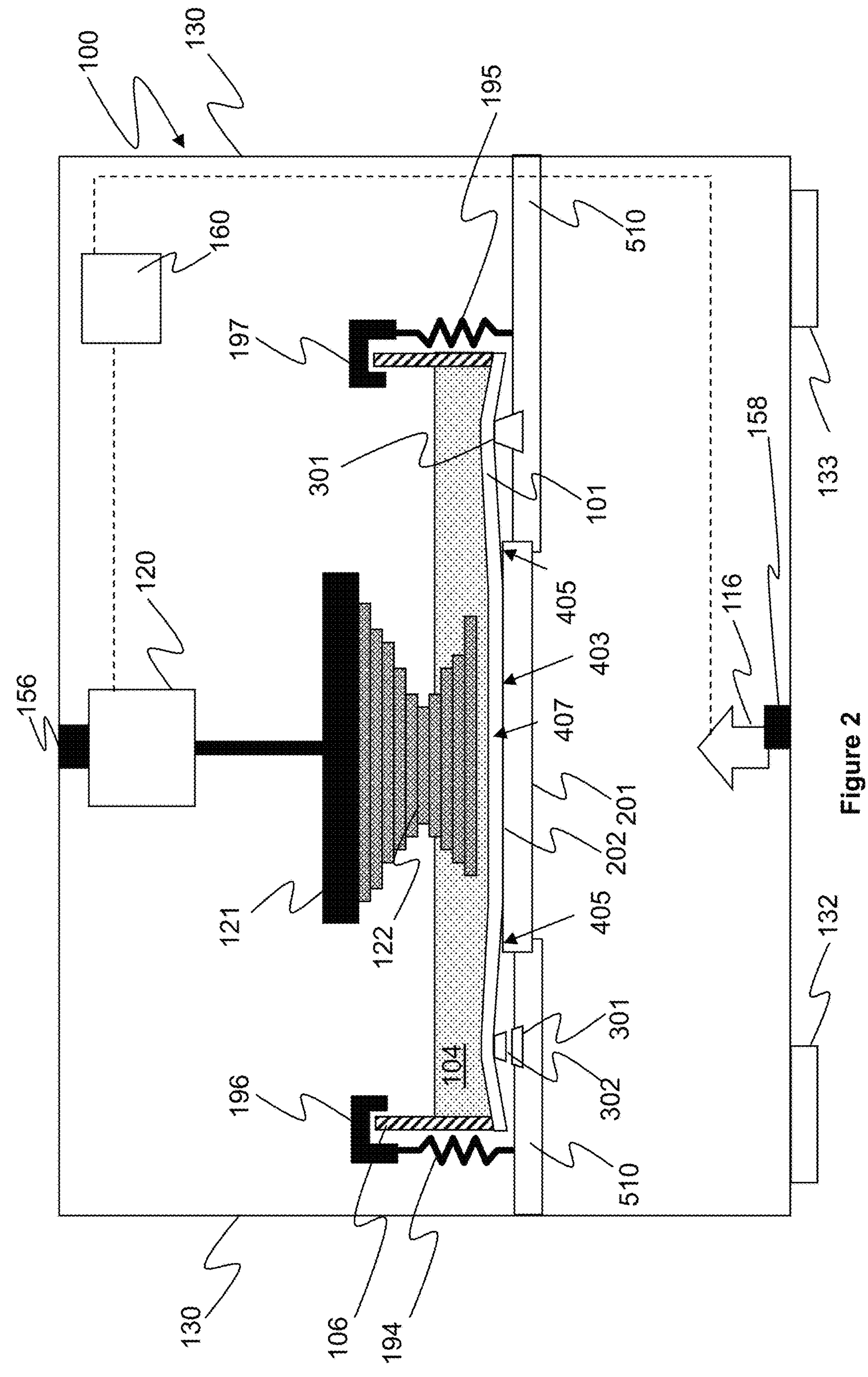

FIGS. 1 to 5 show schematic elevation views of one embodiment of an apparatus for making a stereolithographic object, the apparatus being generally indicated by the numeral 100. As shown in FIG. 1, the apparatus 100 comprises a platform 121 for making the stereolithographic object 122 thereon. The apparatus comprises a flexible element 101 mounted in spaced apart relation to a surface 202 to define a gap 401 therebetween. In use, a material 104 for making the stereolithographic object 122 in the form of a fluid for making the stereolithographic material is disposed between the platform 121 and the flexible element 101. The apparatus 100 comprises a positioner 120 operably coupled to at least one of the platform 121 and the surface 202 and operable to reduce the distance between the platform 121 and the surface 202. As shown in FIG. 2, for example, when the distance between the platform 121 and the flexible element 101 is so reduced, the gap 401 remains at least partially open.

In the context of this document, a stereolithographic object is an object that has been made using a stereolithographic method, embodiments of which are disclosed herein and may be executed by embodiments of apparatus for making a stereolithographic object disclosed herein. Coordinate axes are shown in the figures where x and y are horizontally orientated and z is vertically orientated.

Before the distance between the platform 121 and the flexible element 101 is reduced, the surface 202 and the flexible element 101 are separated—there may be no contact between the flexible element 101 and the surface 202, as shown in FIG. 1. When the distance between the platform 121 and the flexible element 101 is reduced, however, a portion of the gap 403 is closed and another portion of the gap 405 remains open. The portion of the gap 405 that remains open encloses a portion 407 of the flexible element 101 in contact with the surface 202.

The platform 121 and surface 202 are cooperatively arranged for the fluid 104 to hydraulically couple the stereolithographic object 122 being made to the flexible element 101 such that the portion of the gap 403 is hydraulically closed when the positioner 120 is operated to reduce the distance between the platform 121 and the surface 202.

The other portion of the gap 405 remains open for the ingress of another fluid between the flexible element 101 and the surface 202 when the positioner 121 is operated to increase the distance between the platform 121 and the surface 202.

The distance d between the flexible element 101 and the surface 202 is in the present but not all embodiments in the range of 10 μm to 1000 μm. The distance d may be less than 10 μm in another embodiment otherwise identical to that of FIGS. 1-5 and greater than 1000 μm in yet another embodiment otherwise identical to that of FIGS. 1-5.

Figure 4:
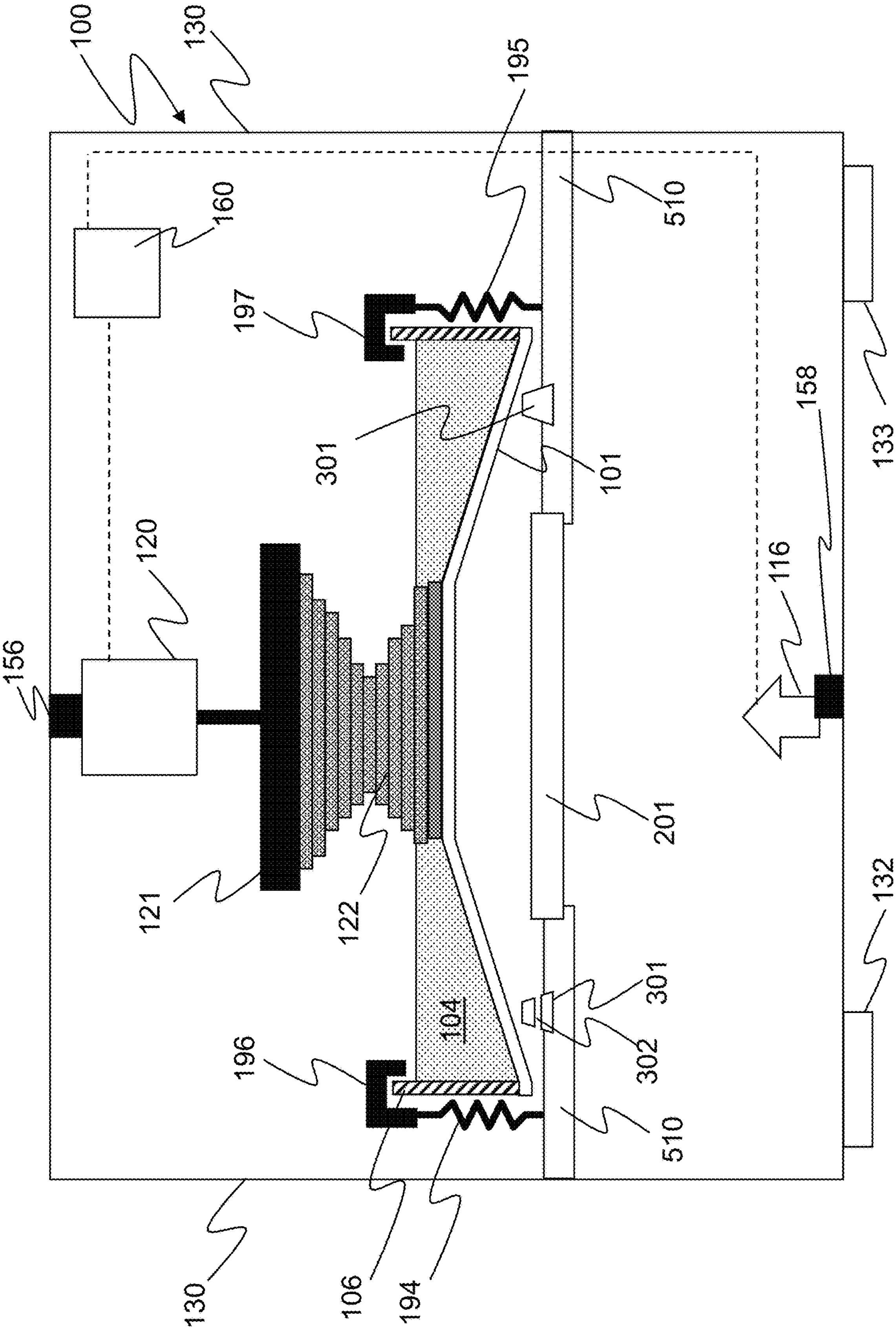
Figure 5:
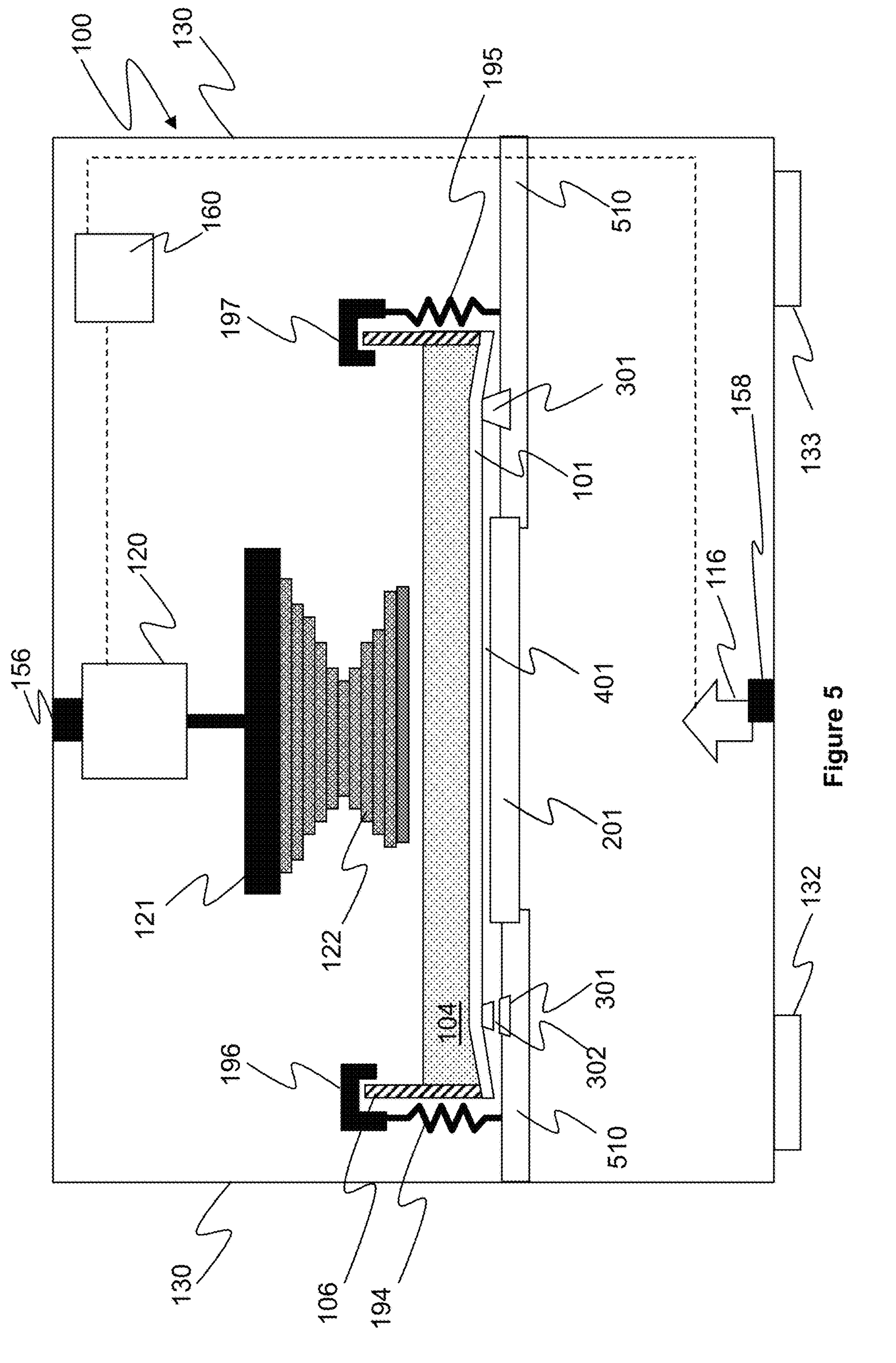
Figure 6:
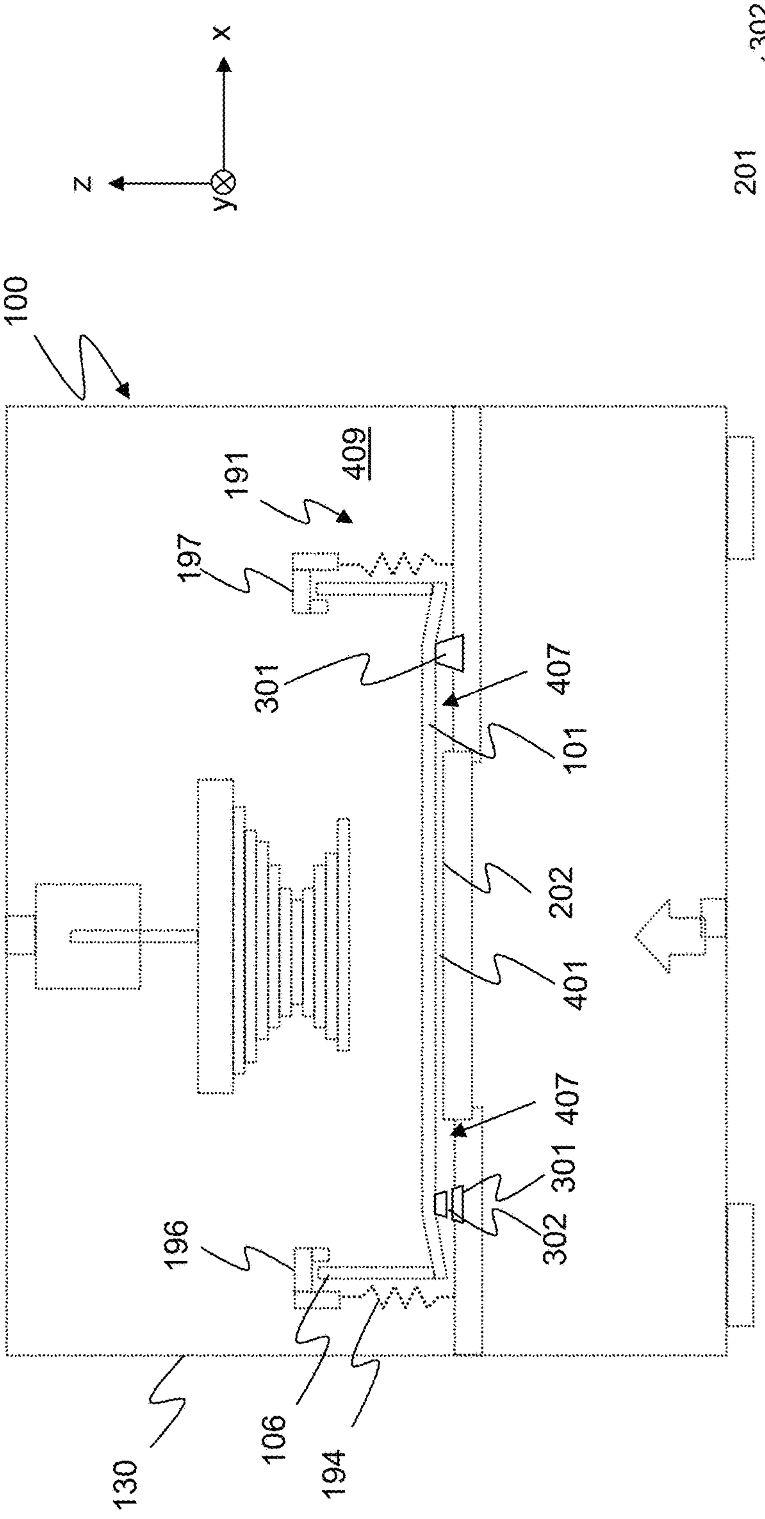
FIG. 6 shows a simplified view corresponding to FIG. 1.
Figure 7:
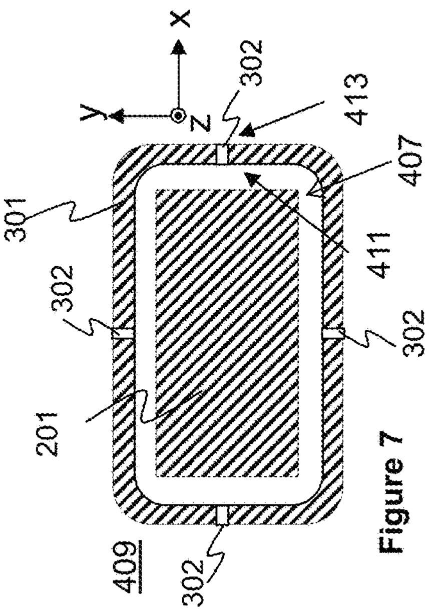
FIG. 7 shows a section A-A through a x-y plane of a flexible element tensioner of the apparatus of FIGS. 1-5.

FIG. 6 shows a side elevational view of the apparatus of FIGS. 1-5, which has been simplified. As seen in FIG. 6, the apparatus 100 comprises a flexible element tensioner 301, which is shown in unbroken lines. Features not part of the flexible element tensioner 301 are shown in dotted lines. Another embodiment, however, does not comprise a flexible element tensioner. The flexible element tensioner 301 contacts the flexible element 101, in this embodiment a downwardly orientated face of the flexible element 101 that is opposite the surface 202 is in contact with the flexible element tensioner 301. FIG. 7 shows a section A-A through a x-y plane of flexible element tensioner 301 and a member or plate 201 in the form of a fluid hardening radiation transparent plate, the plate 201 comprising the surface 202. The flexible element tensioner 301 supports the flexible element 101 around a perimeter of the transparent plate 201. The flexible member 101 and the flexible element tensioner 301 are biased together with biasing elements 194, 195 in the form of extension springs engaged to vessel sidewalls 106 with clips 196,197. The tensioner tensions the flexible element 101 in both the x and y directions. The flexible element 101 is pulled towards the tensioner 301, but in alternative embodiments the tensioner may be alternatively or additionally pulled towards the flexible element.

Figure 8:
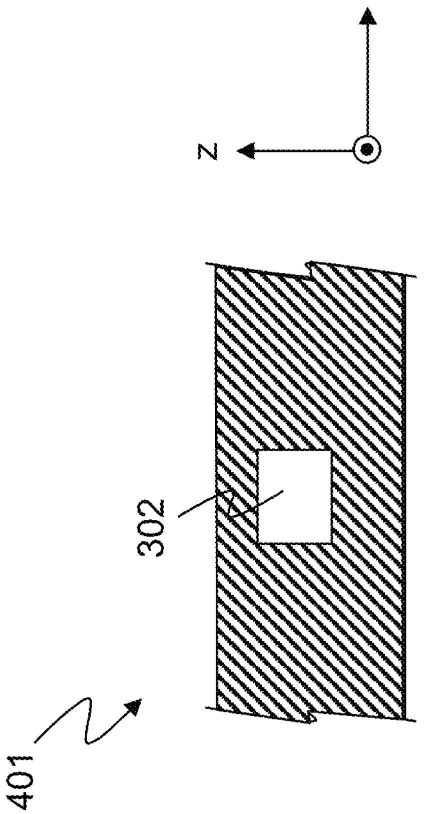
FIG. 8 shows a section B-B through a y-z plane of the flexible element tensioner of FIG. 7.

The flexible element tensioner 301 defines a space 407 interior of the flexible element tensioner 301 comprising the gap 401. The flexible element tensioner 301 is arranged for pressure equalisation between the gap 401 and another space 409 exterior of the flexible element tensioner 301. The other space 409 is part of the atmosphere, in this but not all embodiments. In this but not all embodiments, the flexible element tensioner 301 has at least one pressure equalisation port 302—in this embodiment a plurality of pressure equalisation ports 302 totalling four—for pressure equalisation between the space 407 interior of the tensioner 301 and the exterior 409. The plurality of pressure equalisation ports 302 each define an interior space opening 411 and an exterior space opening 413 that are connected by a passageway. Each of the plurality of pressure equalisation ports 302 comprise at least one of a groove and an aperture. FIG. 8 depicts section B-B through the tensioner 301 indicated by the numeral 300 in the case where the pressure equalization port 302 comprises a groove, and indicated by the numeral 400 is the case where the pressure equalization port 302 comprises an aperture. The plurality of pressure equalisation ports 302 allow communication of a fluid in the form of air between the exterior space 409 and the interior space 407. Air may flow through the plurality of pressure equalisation ports 302 to equalize air pressure.

Figure 9:
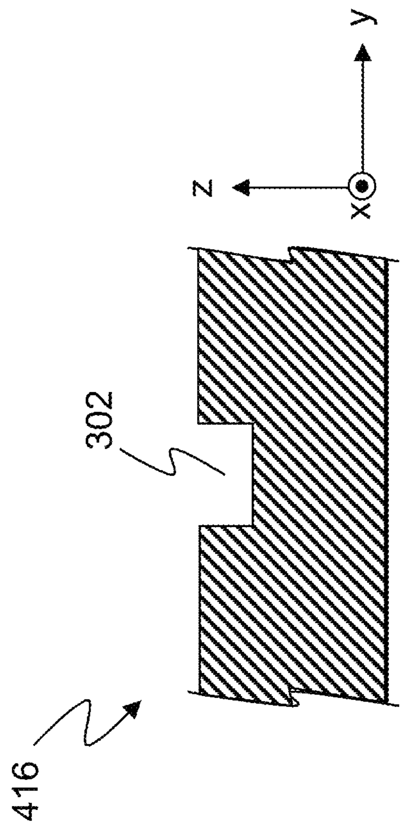
FIG. 9 shows a section B-B through a y-z plane of another example of a flexible element tensioner.

In an alternative embodiment, the plurality of pressure equalization ports 302 of FIGS. 7, 8 and 9 may be equipped with a fluid occluding diaphragm, not shown in the figures, which may allow air pressure to be communicated without the free flow or exchange of air or other fluid.

The positioner 120 is configured for linear motion along the plus and minus z-directions. The positioner 120 moves the platform 121 in the form of an inverted platform on which the stereolithographic object 122 being made is mounted towards the surface 202. Alternatively or additionally, the positioner 120 may be arranged to move the flexible element 101 and the surface 202 together towards the platform 121. During fabrication, the stereolithographic object 122 being made is attached to the platform 121. The positioner 120 positions the platform 121 and consequently the object being made 122 relative to the material receiving surface 102, which is in this but not all embodiments an upwardly facing surface.

The positioner 120 is controlled by a control system 160 to change the distance between the platform 121 and the material receiving surface 102. The control system 160 is configured to receive instructions for making the stereolithographic object in the form of data indicative of a plurality of sections (e.g. 124) to be formed sequentially by the apparatus 100. Each individually determined section may differ from another of the sections by, for example, the shape of their respective boundaries. Not every section needs to be different, however. The control system 160 is configured to coordinate operation of the positioner 120, a material solidifying radiation source 116, and in some embodiments other parts, such that the plurality of sections are sequentially formed in accordance with the received instructions. The control system 160 comprises a processor.

In the context of this specification, a section is to be understood to encompass a slice of the stereolithographic object. A planar section encompasses a portion of the stereolithographic object located between two parallel planes that intersect the stereolithographic object. Generally, but not necessarily, the sections formed are planar sections. Alternative embodiments may be configured for arcuate sections, for example.

An embodiment of a method for making a stereolithographic object 124 will now be described with reference to FIGS. 1 to 5. The process may begin as shown in FIG. 1, with the previous made sections of the stereolithographic object being made 122 spaced apart from the flexible sheet 101.

Next, as shown in FIG. 2, positioner 120 lowers the stereolithographic object 122 being made towards the flexible element 101. The flexible element 101 deflects to abut the surface 202 which stops further deflection of the flexible element 101. The stereolithographic object 122 comes to a final position which is one section-thickness above the sheet surface 102 when the flexible element 101 is in contact with the surface 202.

Surface 202 is in the form of a reference surface that shapes the flexible element 101 to have it adopt a configuration or form while excess fluid 104 is forced out from between the stereolithographic object being made 122 and the flexible element 101. In this embodiment, the surface 202 is a flat reference surface and the configuration is a flat configuration, however it may be curved or generally any suitable configuration in other embodiments. Support of the flexible element 101 by the reference surface 202 may allow for especially flat sections of precise thicknesses to be formed.

The thickness of one section of the stereolithographic object 122 (and so a layer of the fluid immediately prior to irradiation) is typically in the range of 10 μm to 250 μm, but it may be less if particularly fine fabrication resolution is required, and greater if a relatively coarse fabrication resolution is required.

Figure 3:
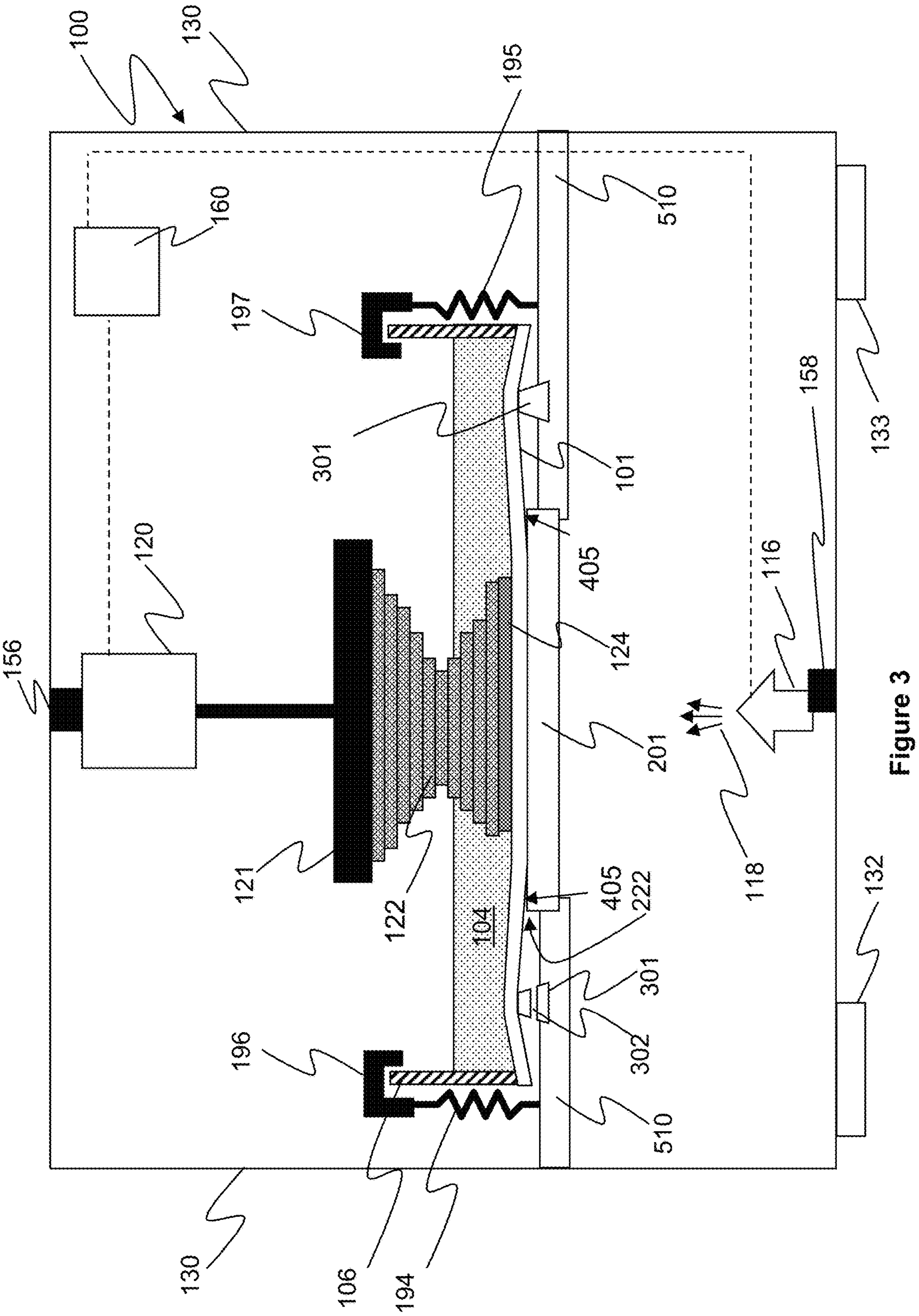

Next, as shown in FIG. 3, fluid solidifying radiation 118 in the form of fluid solidifying light, having spatial features in accordance with the sectional geometry of the stereolithographic object 122 being made, is emitted from a fluid solidifying radiation source 116 in the form of a fluid solidifying light source to selectively harden regions of the layer of fluid 104 in contact with the previously formed sections 122 to form a new hardened section 124.

Next, as shown in FIG. 4, the positioner 120 is engaged to raise the previously formed sections 122 and newly formed section 124, causing the flexible element 101 to stretch and distort. As the flexible element 101 is pulled away from the surface 202, air enters the potion of the gap 405 between the flexible element 101 and surface 202. The ingress of air through pressure equalization port 302 prevents vacuum forces from opposing the separation of the flexible element 101 from the surface 202.

This may allow the flexible element 101 to distort to peel away from the section 124. The forces experienced by the section during peeling separation from the surface is typically much less than the force generated when separating the section from the surface in other ways. Consequently, risk of damage to the section and/or the stereolithographic object being made may be reduced.

Once the peeling angle is sufficiently large the flexible element 101 peels away from the newly formed section 124 and the apparatus 100 is ready for the process to start again, as shown in FIG. 5. Repeating this these steps for the other sections enables a stereolithographic object to be fabricated.

The presence of the gap 401 and the portion of the gap 405 significantly reduces the forces during the separation of a section 124 of the stereolithographic object 122 being made from the flexible element 101. The portion of the gap 405 facilitates passage of air between the flexible element 101 and the surface 202 by presenting a fluid opening 222 via which a fluid in the form of air, for example, can enter, as depicted in FIG. 3. It may be desirable, but not essential, for the gap 401 to be sufficiently small so that any curvature in the sheet is 1/10 to 10 times the thickness of a section of the object being made.

Figure 10:
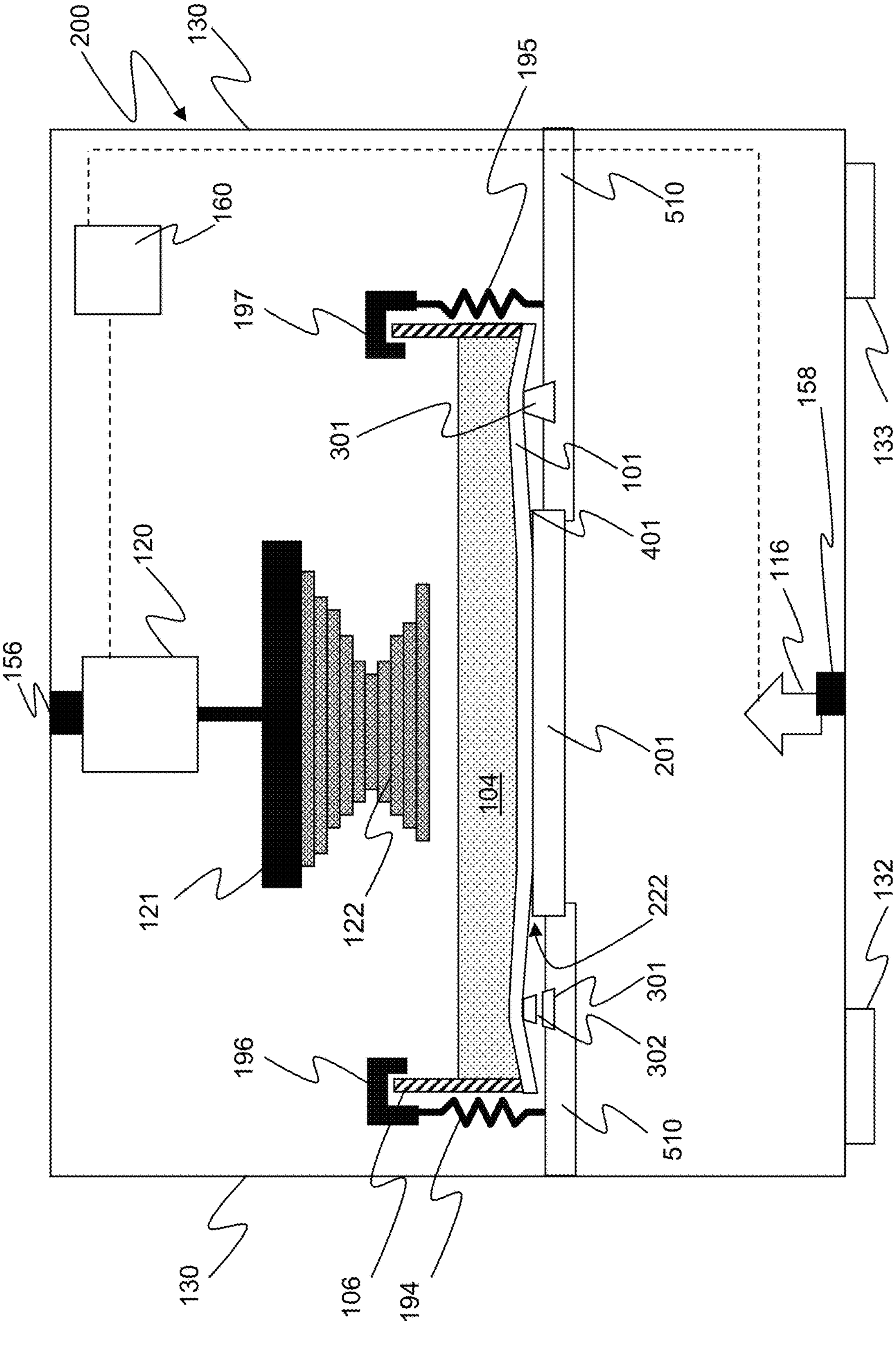
FIG. 10 shows a side elevation view of another embodiment of an apparatus for making a stereolithographic object.

In prior art apparatus for making stereolithographic objects which have no gap 401, the polymer sheet 101, being pliable, forms a seal at the peripheral edges of the surface 202, which obstructs the flow of air between the flexible element 101 and the surface 202. To investigate the importance of the gap 401, an experimental apparatus was constructed by the applicant. It was determined that the forces required to separate the stereolithographic object 122 being made from the flexible element 101, which has a rectangular section having dimensions 125 mm by 70 mm, was 1.22 kg when the gap 401 was 100 μm and the separation velocity was 2 mm/s. However, without the gap 401 the separation forces increased to 8.54 kg, all other things being equal. The lower separation forces with the gap 401 present may enable production of objects of high precision, as reduced separation forces may be applied to the object during its construction, which may reduce the risk of distortion and breakage. It may also reduce fabrication time. FIG. 10 shows a side elevation view of another embodiment of an apparatus for making a stereolithographic object 200, where parts similar in form and/or function to those in FIGS. 1 to 5 are similarly numbered. The weight of the fluid 104 above the flexible element 101 may cause it to sag, as depicted in FIG. 10, however there is still a gap 401 between the flexible element 101 and the surface 202. The gap 401 encloses a portion of the flexible element 101 in contact with the surface 202. The degree of sag of the flexible element 101 is dependent on, for example, the tension in the flexible element 101 and the weight of the fluid 104. The plate 201 supports the flexible element when the fluid is disposed thereon and limits the degree of sag of the flexible element. Sag may be expected and may not affect the performance of the fabrication process if controlled. Sag may, however, be undesirable because the sections formed adjacent the surface 202 may deviate from being planar sections, which may cause fabrication of a malformed stereolithographic object.

Figure 11:
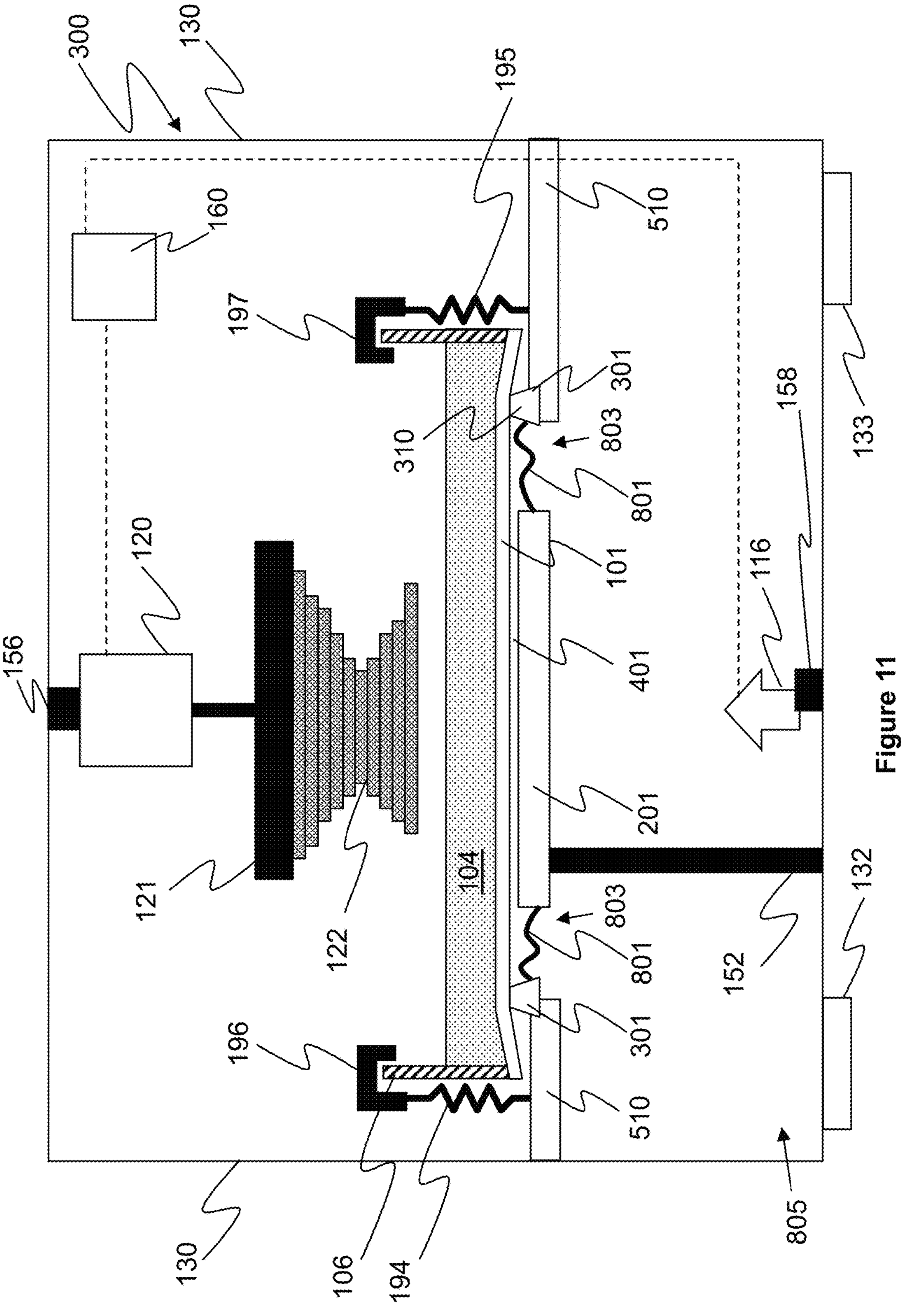
FIGS. 11 and 12 shows side elevational views of other embodiments of an apparatus for making a stereolithographic object.

FIG. 11 shows a side elevational view of another embodiment of an apparatus 300 for making a stereolithographic object 122, wherein parts similar and/or identical in form and/or function to the apparatus 100 are similarly numbered. The plate 201 and the flexible element tensioner 301 are cooperatively arranged to define at least one pressure equalisation port therebetween. The tensioner 301 of FIG. 11 does not have pressure equalisation ports defining passageways therethrough. The apparatus 300 comprises at least one occluding diaphragm 801 impervious to air (or an alternative fluid, for example nitrogen) extending across at least one pressure equalisation port 803. The diaphragm 801 may allow fluid in the form of air in the lower section 805 of the apparatus 300 to pressure equalise with fluid in the form of air in the gap 401, ameliorating the vacuum forces when the flexible element 101 is deformed upwards and thereby facilitating the process of separation of the stereolithographic object 122 being made from the flexible element 101. The diaphragm 801 prevents fluid 104 for making the stereolithographic object either spilled or leaked through a tear in the flexible element 101 from entering the lower section 805 of the apparatus 300.

Figure 12:
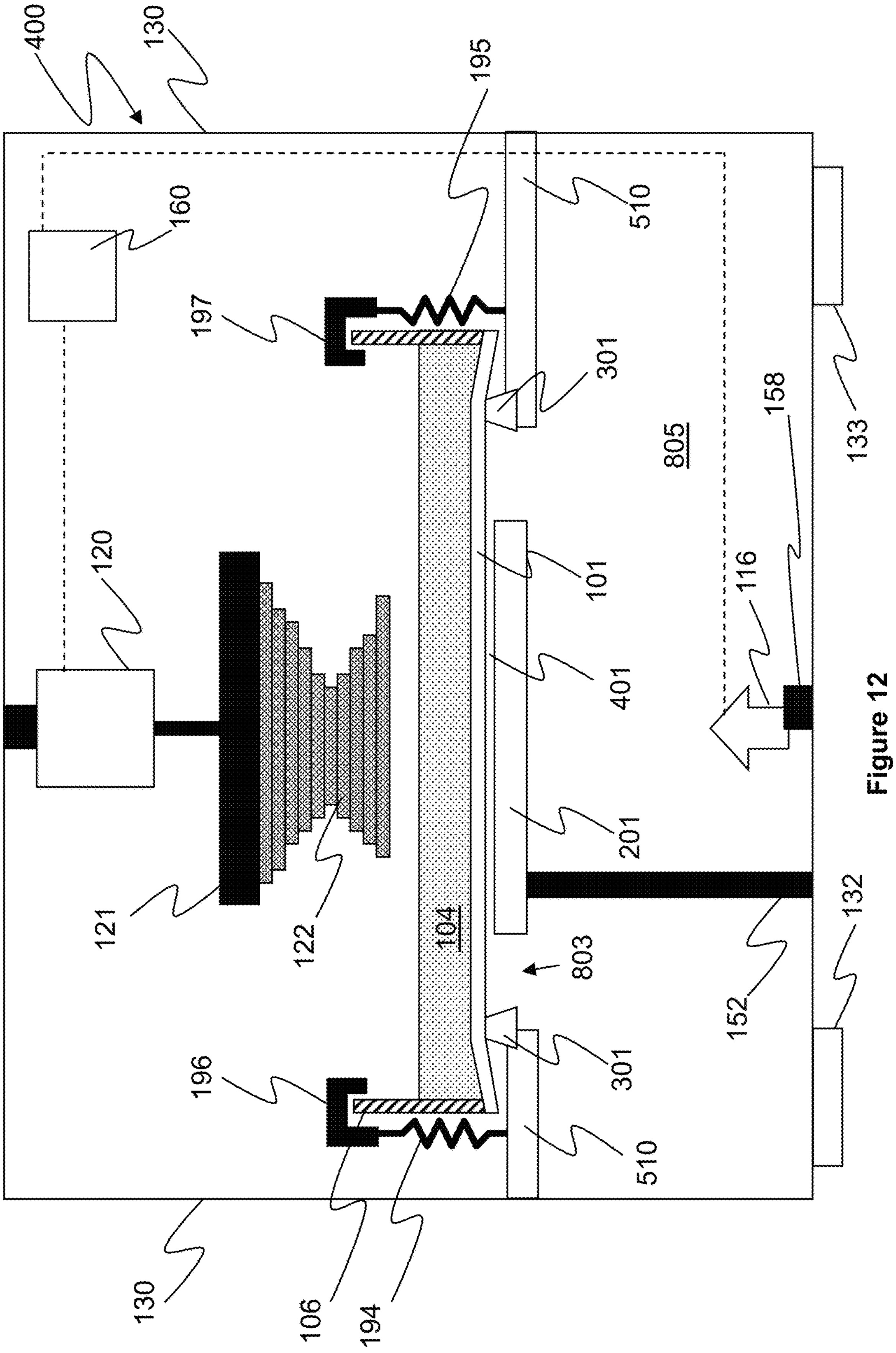

FIG. 12 shows a side elevational view of yet another embodiment of an apparatus 400 for making a stereolithographic object 122, wherein parts similar and/or identical in form and/or function to the apparatus 300 are similarly numbered. This embodiment does not have a diaphragm 801.

In an alternative embodiment, a surface of the flexible element tensioner in contact with the flexible element is configured to define at least one pressure equalisation port. The surface may have grooves formed thereon, for example, that define the ports.

Further details of apparatus 100 will now be described, which can be generally shared by other embodiments as suitable and desired.

The flexible element 101 is in the form of a substantially transparent sheet or membrane having the upward facing material receiving surface 102, however in other embodiments the material receiving surface 102 may be downward facing. The fluid 104 for making the stereolithographic object is in the form of a layer of radiation solidifiable liquid 104 disposed on the material receiving surface 102 and that which solidifies when exposed to a liquid solidifying radiation 118. The liquid solidifying radiation 118 may be visible or invisible light (ultraviolet light, for example). Example wavelengths of suitable light include 355 nm, 385 nm, and 405 nm. In some embodiments, radiation sources other than a light source may be used. For example, the radiation source 116 may be ionizing or non-ionizing radiation.

The photohardenable liquid may comprise a mixture of acrylate monomers and oligomers, photoinitiators, colourants and stabilizers such that the mixture polymerizes when exposed to suitable light. Example liquids include Somos NEXT from DSM Somos, USA, and KZ-1860-CL from Allied PhotoPolymers, USA. In alternative embodiments, the material may comprise a powder such as a fluidized polymer powder, or a paste. Any suitable material may be used.

Flexible element 101 may possess anti-stick properties in relation to the material 104 when it is cured in contact with the sheet. Suitable materials for flexible element 101 include FEP fluoropolymer film manufactured by Du Pont, USA. The flexible element 101 may be of around 125 micrometers thickness, but may be thicker or thinner as appropriate. The flexible element is flexible but may not be particularly elastic, having a Young's modulus of around 560 MPa. Generally, but not necessarily, a Young's modulus of between 100 and 1000 MPa may be suitable. The flexible element 101 may alternatively comprise PFA fluoropolymer film and Teflon AF film, also manufactured by Du Pont. Still other examples of suitable flexible elements comprise silicone, polyethylene film, polyethylene terephthalate film, and cellulose acetate film. Generally, any suitable material may be used for the flexible element 101.

In this embodiment, the flexible element 101 is not backed by another material or layer, and is homogeneous, that is has a uniform structure and composition throughout. In other embodiments the sheet may have a multi-laminate construction. For example, the sheet may comprise a layer of silicone bonded to a polyester film, the film providing a high Young's modulus and the silicone providing a superior nonstick surface in relation to the liquid 104. Other materials or laminates of different materials may alternatively be used.

The flexible element 101 and side walls 106 form a vessel 108 in the form of a trough or dish for containing the material 104. The vessel 108 may have a volume sufficient to hold enough liquid to build an entire stereolithographic object without being replenished. Optionally, a conduit may connect the vessel and a supply of the material to replenish the material as it is consumed. The flexible element 101 forms the base of the vessel 108. The vessel 108 and material 104 contained therein can be easily removed from the apparatus and replaced with another vessel and other material, thus providing a convenient means for replacing damaged vessels or making objects from different materials.

The thickness of one section of the stereolithographic object 122 is typically in the range of 10 micrometers to 250 micrometers, but it may be less if particularly fine fabrication resolution is required, and greater if a relatively coarse fabrication resolution is required.

The apparatus 100 is configured such that in use the flexible element 101 is horizontally orientated. The chassis 130 has attached feet 132,133 configured to support the chassis 130 above a surface such as a bench, and the flexible element 101 is mounted relative to the chassis 130 so that when the chassis 130 is so supported the flexible element 130 has a horizontal orientation. In other embodiments, the material receiving surface 102 may be inclined at up to 45 degrees to the horizontal (that is, the surface is upwardly facing), provided that the vessel walls 106 are sufficiently high to contain the material 104. Mounting brackets 152, 154,156,158 may be used to ensure that apparatus components are maintained in their correct position and orientation relative to the chassis 130. A mounting platform 510 may serve to mount apparatus components and form a fluid-tight division between the upper and lower regions of the apparatus 100 to prevent ingress of any spilled material 104 which may damage delicate components.

Figure 13:
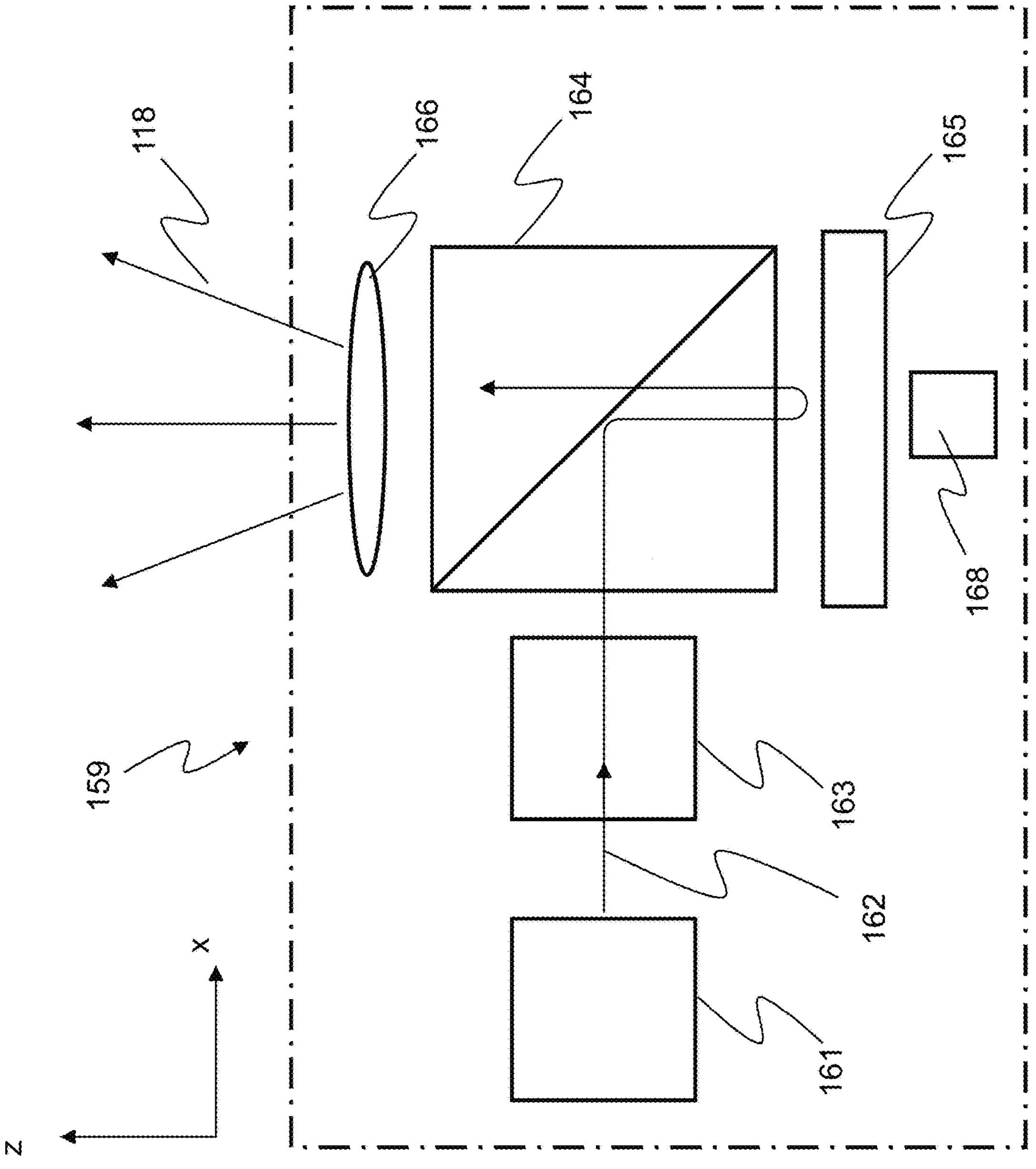
FIGS. 13 to 15 show examples of fluid solidifying radiation sources.
Figure 14:
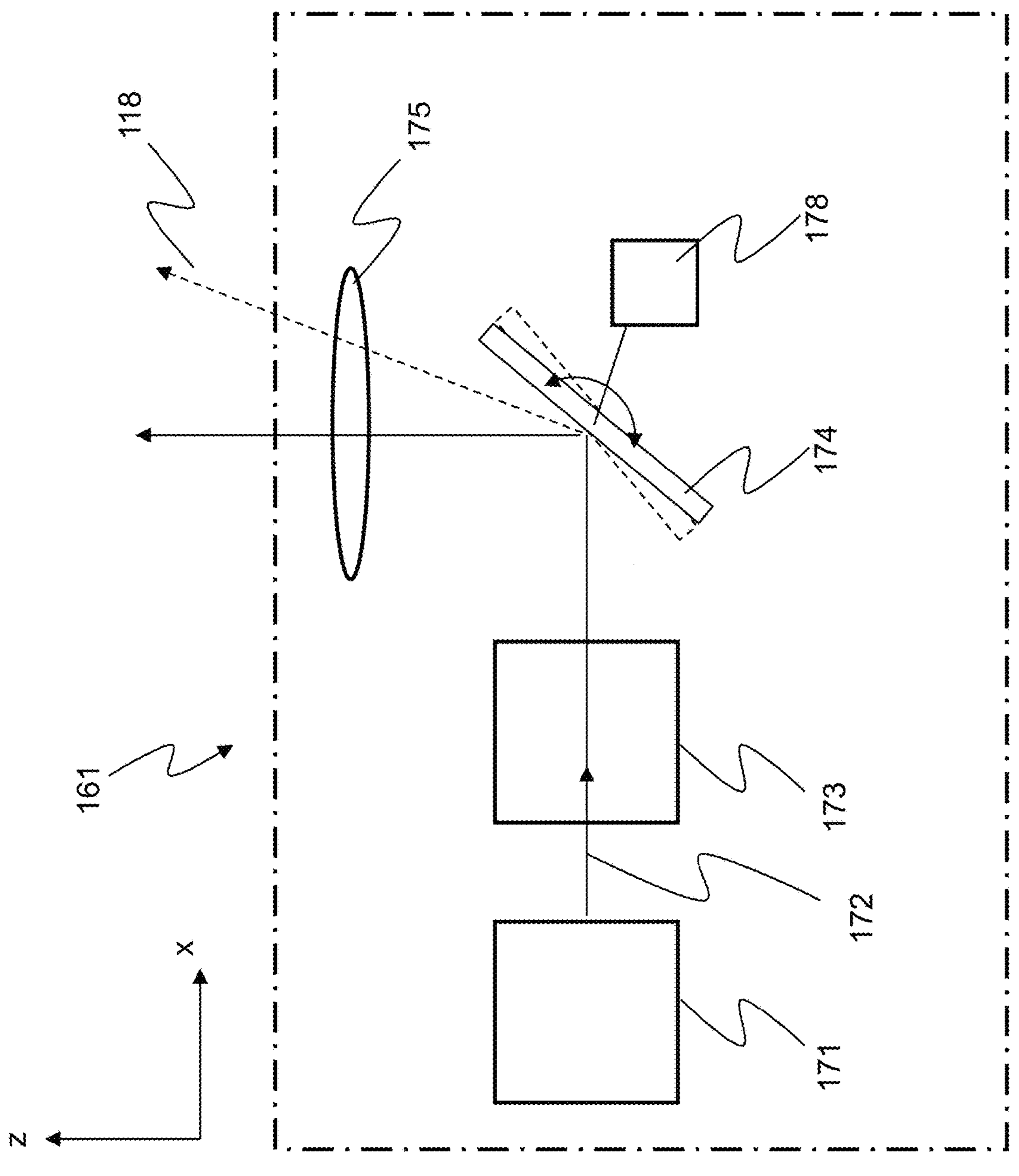
Figure 15:
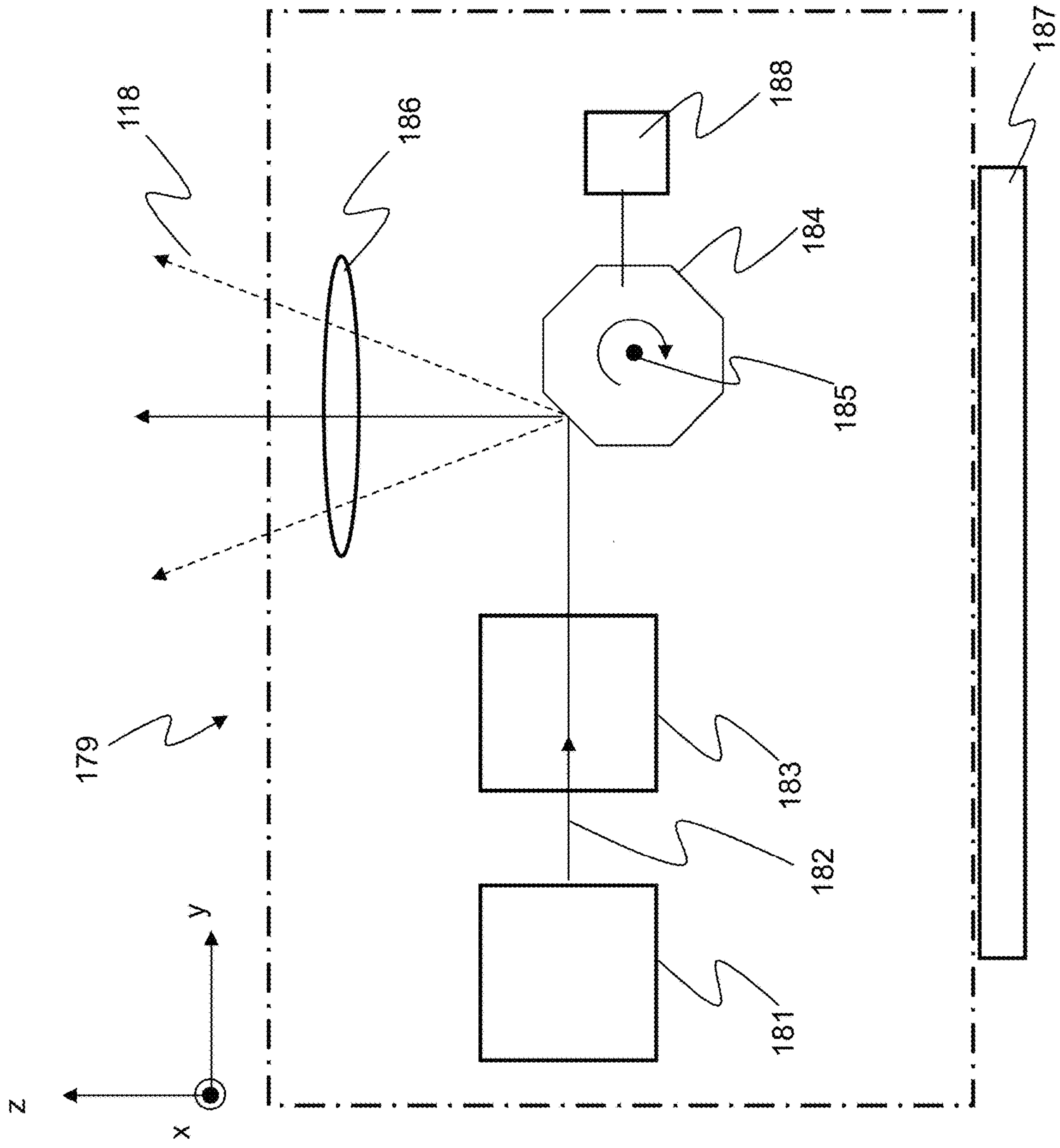

The material solidifying radiation source 116 comprises a light source, and may be activated by the control system 160 so that it emits spatially and/or structured light 118 capable of selectively hardening areas of the material 104 to form a section of the stereolithographic object 122. Material solidifying radiation source 116 may, for example, incorporate a light manipulator such as an image projection system depicted in FIG. 13 and generally indicated with the numeral 159, comprising light source 161 emitting light 162, relay optics 163, turning prism 164, spatial light modulator 165 controllable by control system 168, and projection lens 166. Alternatively, material solidifying radiation source 116 may be a light beam scanning apparatus depicted in FIG. 14 and generally indicated by the numeral 161, comprising a laser source 171 emitting light 172 of wavelength of around 350 nm, for example, collimating and/or focusing optics 173, scanning mirror 174 whose rotation is controllable in one or more axes by mirror controller 178, optionally a second controllable mirror not shown in the figure, and optionally a projection lens 175 such as an F-Theta lens. Control system 160 can be configured to scan the mirror 174 (coordinated with a second mirror, if present) in a raster scanning mode, or alternatively in a vector scanning mode. FIG. 15 shows a second type of beam scanning apparatus generally indicated by the numeral 179 comprising a laser source 181 emitting light 182, collimating and/or focusing optics 183, polygon mirror 184 rotatable around an axis 185 and controllable by controller 188, and optionally a projection lens 186 such as an F-Theta lens. As the apparatus of 179 may only scan light in the y-axis according to the coordinate system shown in FIG. 15, the apparatus resides on a translation stage 187 which can move the apparatus in the x-direction, enabling the projected light to address locations in the x and y dimensions. The translation stage may comprise any one or more of linear motors, drive belts, stepper motors, rack and pinion arrangements, for example, or generally any suitable components arranged to provide translation. Apparatus 179 is suitable for operating in a raster scanning mode. The light source may, in some embodiments, comprise an incandescent light or light emitting diode, for example. Any suitable light source May be used.

The positioner 120 may comprise any one or more of linear motors, drive belts, stepper motors, rack and pinion arrangements, for example, or generally any suitable components arranged to provide linear motion. In the present embodiment the positioner comprises a linear actuator in the form of a servomotor, a carriage moved by the linear actuator and a rail orientated in the z direction along which the carriage travels. The platform 121 is attached to the carriage. The positioner 120 may have a dedicated servomotor controller, as in the present embodiment, however in other embodiments the control system 160 may control the servomotor. The carriage can be moved along the rail to a positioner position value.

Figure 16:
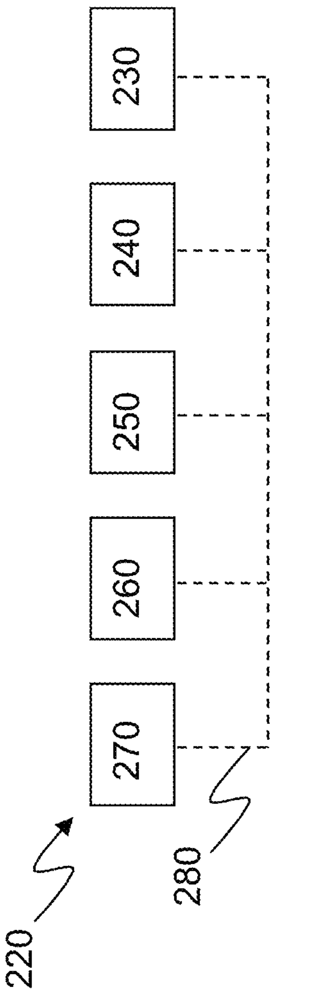
FIG. 16 shows a schematic of an architecture of a control system.

The positioner 120, the material solidifying radiation source 116, and possibly other parts of the apparatus 100 may be in communication with and may be controlled by the control system 160 to coordinate the apparatus 100 to make the stereolithographic object 122. These and other components may be connected by wires, cables, wireless, or any other suitable means. In this embodiment, the control system 160 has a processor 220 in the form of a processor unit, schematically illustrated in FIG. 16. The processor unit 220 may include a suitable logic device 250 such as, or similar to, the INTEL PENTIUM, ARM processor, or a suitably configured field programmable gate array (FPGA), connected over a bus 280 to a random access memory 240 of around 100 Mb and a non-volatile memory such as a hard disk drive 260 or solid state non-volatile memory having a capacity of around 1 Gb. The processor has input/output interfaces 270 such as a universal serial bus and a possible human machine interface 230 e.g. mouse, keyboard, display etc. Device components may be controlled using commercially available machine-to-machine interfaces such as LABVIEW software together with associated hardware recommended by the commercial interface provider installed on the processor unit 220, over USB or RS-232 or TCP/IP links, for example. Alternatively, custom driver software may be written for improved performance together with custom printed circuit boards. Alternatively, the processor unit 220 may comprise an embedded system, or a microcontroller.

In this embodiment, the control system 160 is in communication with another processor which is adapted for determining instructions and/or information for the device. In alternative embodiments, the processors are the same processor. An example of the other processor comprises a logic device such as, or similar to, the INTEL PENTIUM or a suitably configured field programmable gate array (FPGA), connected over a bus to a random access memory of around 4 Gb and a non-volatile memory of such as a hard disk drive or solid state non-volatile memory having a capacity of around 1 Tb. Generally, the configuration may be similar or identical to that shown in FIG. 16. The processor has a receiver such as a USB port (or Internet connection, for example) for receiving information representing a solid object, stored on a USB FLASH device, for example. The information may be encoded in a file generated by a Computer Aided Design (CAD) program, the information specifying the geometry of the object. The other processor runs a decomposer program implementing an algorithm that decomposes (or transforms) the information into data indicative of a plurality of sections to be formed sequentially by the device, the material being used to make the solid object. The program may have been installed onto the processor from tangible media such as a DVD or USB memory stick, for example, that stored the program. In an alternative embodiment, the decomposer may be a dedicated hardware unit. A series of sections through the object are determined, each section corresponding to a solid section to be formed. The sections may then be further processed to represent the geometry of each section as a rasterised bitmap. The sections or bitmaps may then be used to control the device.

Embodiments described herein may be used to make a stereolithographic object of generally any shape or size, including jewelry such as rings, prototype car components, micro-components for precision machines, models for investment casting, rapid prototypes, dental models, hearing aids, models of anatomical and other objects, circuit boards and architectural or design features for a building. The stereolithographic object may, for example, be rigid or resilient. It may have one or more hollows or voids, such as that of a cup or tennis ball, for example.

Now that embodiments have been described, it will be appreciated that some embodiments may have some of the following advantages:

The flexible element may distort when the stereolithographic object 122 being made is withdrawn, and the flexible element 101 and surface 202 separated with reduced vacuum forces, causing the flexible element 101 to peel away from the stereolithographic object 122 being made, in which case the stereolithographic object being made experiences reduced forces than that generated when separating the stereolithographic object being made from the flexible element 101 by other ways. Consequently, the risk of damage to the solid section and/or the object being made may be reduced.

The surface 202 supporting the flexible element controls sagging of the flexible element 101, and provides support when a previously formed section is brought into close proximity to the flexible element 101 and the liquid is squeezed out from between the flexible element 101 and the stereolithographic object 122 being made, thereby improving the flatness of the sections of the stereolithographic object and reducing distortions in the object.

Delicate stereolithographic objects may be made that may not be made using another approach.

Variations and/or modifications may be made to the embodiments described without departing from the spirit or ambit of the invention. While the pressure equalising fluid in the present embodiments is air, it may be another gas, examples of which include but are not limited to nitrogen and argon. Alternatively, the fluid may be a liquid, for example methyl alcohol, another low viscosity liquid, or generally any suitable liquid. The flexible element may not be flat like a sheet, but rather may be wedged. The downwardly facing surface of the flexible element may be textured. The upward facing surface of the reference plate may be textured. The apparatus may be inverted, with the vessel enclosing the positioner and platform. The present embodiments are, therefore, to be considered in all respects as illustrative and not restrictive. Reference to a feature disclosed herein does not mean that all embodiments must include the feature.

Prior art, if any, described herein is not to be taken as an admission that the prior art forms part of the common general knowledge in any jurisdiction.

In the claims which follow and in the preceding description of the invention, except where the context requires otherwise due to express language or necessary implication, the word "comprise" or variations such as "comprises" or "comprising" is used in an inclusive sense, that is to specify the presence of the stated features but not to preclude the presence or addition of further features in various embodiments of the invention.

The invention claimed is:

1. An apparatus for making a stereolithographic object, the apparatus comprising:

a platform for making the stereolithographic object thereon, a vessel comprising a plurality of vessel side walls, and a flexible element extending between the plurality of vessel side walls, a reference surface that is flat for receiving the flexible element and configured for flattening the flexible element when so received, wherein the flexible element is mounted between the reference surface and the platform, the flexible element being in spaced apart relation to the reference surface to define a gap extending between the reference surface and the flexible element, wherein in use a material for making the stereolithographic object is disposed between the platform and the flexible element;

a positioner operably coupled to at least one of the platform and the reference surface and operable to reduce the distance between the platform and the reference surface, wherein when the distance between the platform and the reference surface is so reduced the gap remains at least partially open; and a flexible element tensioner inboard of the plurality of vessel side walls, the flexible element tensioner being configured to support the flexible element, while spaced apart from the reference surface, around a perimeter of the reference surface and defining at least one pressure equalisation port through the flexible element tensioner;

wherein the at least one pressure equalisation port and the flexible element are cooperatively arranged such that the gap is in pressure communication with an exterior for pressure equalization between the gap and the exterior.

2. The apparatus of claim 1, wherein when the distance is so reduced a portion of the gap is closed and another portion of the gap remains open.

3. The apparatus of claim 2, wherein the material for making the stereolithographic object comprises a fluid for making the stereolithographic object, and the platform and the reference surface are cooperatively arranged for the fluid for making the stereolithographic object to hydraulically couple the stereolithographic object when being made to the flexible element such that the portion of the gap is hydraulically closed when the positioner is operated to reduce the distance between the platform and the surface.

4. The apparatus of claim 1, wherein the gap remains at least partially open for the ingress of a fluid between the flexible element and the surface when the positioner is operated to increase the distance between the platform and the surface.

5. The apparatus of claim 4, wherein the fluid comprises air.

6. The apparatus of claim 1, comprising one or more biasing elements that bias the flexible element tensioner and the flexible element together.

7. The apparatus of claim 1, wherein the at least one pressure equalisation port extends parallel with respect to the flexible element.

8. The apparatus of claim 1, wherein a flexible element tensioner surface is configured to define the at least one pressure equalization port.

9. The apparatus of claim 1, wherein the at least one pressure equalization port comprises a passageway that provides fluid communication with an atmosphere.

10. The apparatus of claim 1, comprising a vessel for the material, the vessel comprising the flexible element.

11. The apparatus of claim 1, wherein the flexible element is at a bottom of a vessel for containing the material.

* * * * *